United States Patent
Azizi et al.

(10) Patent No.: US 9,912,462 B2
(45) Date of Patent: Mar. 6, 2018

(54) APPARATUS, COMPUTER READABLE MEDIUM, AND METHOD FOR ALIGNMENT OF LONG TRAINING FIELDS IN A HIGH EFFICIENCY WIRELESS LOCAL-AREA NETWORK

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 79 days.

(21) Appl. No.: 14/835,423

(22) Filed: Aug. 25, 2015

(65) Prior Publication Data

US 2016/0323848 A1    Nov. 3, 2016

Related U.S. Application Data

(60) Provisional application No. 62/153,615, filed on Apr. 28, 2015.

(51) Int. Cl.
*H04W 4/00* (2009.01)
*H04L 5/00* (2006.01)

(52) U.S. Cl.
CPC .......... *H04L 5/0064* (2013.01); *H04L 5/0051* (2013.01); *H04L 5/001* (2013.01); *H04L 5/0037* (2013.01)

(58) Field of Classification Search
CPC ...... H04W 72/04; H04L 5/0051; H04L 5/001; H04L 5/0037

(Continued)

(56) References Cited

U.S. PATENT DOCUMENTS

| 2011/0116565 A1 | 5/2011 | Mujtaba |
| 2014/0029681 A1 | 1/2014 | Zhang et al. |

(Continued)

FOREIGN PATENT DOCUMENTS

WO    WO-2016175912 A1    11/2016

OTHER PUBLICATIONS

"International Application Serial No. PCT/US2016/019726, International Search Report dated Jul. 22, 2016", 3 pgs.

(Continued)

*Primary Examiner* — Faisal Choudhury
(74) *Attorney, Agent, or Firm* — Schwegman Lundberg & Woessner, P.A.

(57) ABSTRACT

Apparatuses, computer readable media, and methods for extending a long-training field are disclosed. An apparatus of a high-efficiency (HE) wireless local-area network (HEW) device is disclosed. The apparatus including transceiver circuitry and processing circuitry configure to determine if a HE long training field (HE-LTF) portion of a HE physical layer convergence procedure (PLCP) protocol data unit (HE-PPDU) is to be extended, and if the HE-LTF portion is to be extended, configure the HE-LTF portion to use a longer symbol duration, or one or more additional HE-LTFs. The transceiver circuitry and processing circuitry configure also to transmit the HE-PPDU in accordance with orthogonal frequency division multiple access (OFDMA). An apparatus of a HEW device includes circuitry configured to receive a HE-LTF portion of a HE-PPDU, determine if the HE-LTF portion of the HE-PPDU is extended, and if the HE-PPDU portion is extended, use the extended portion to improve channel estimates.

18 Claims, 11 Drawing Sheets

(58) Field of Classification Search
USPC .......................................................... 370/329
See application file for complete search history.

(56) References Cited

U.S. PATENT DOCUMENTS

| | | |
|---|---|---|
| 2014/0211775 A1 | 7/2014 | Sampath et al. |
| 2014/0362935 A1 | 12/2014 | Porat et al. |
| 2016/0007342 A1* | 1/2016 | Seok .................... H04B 7/0452 370/338 |
| 2016/0212246 A1* | 7/2016 | Seok ..................... H04L 69/323 |
| 2016/0242177 A1* | 8/2016 | Seok ................ H04W 72/0446 |
| 2016/0249397 A1* | 8/2016 | Seok .................... H04W 76/023 |
| 2016/0285608 A1* | 9/2016 | Kwon ................... H04L 5/0055 |
| 2016/0286533 A1* | 9/2016 | Ghosh .................. H04L 5/0007 |
| 2016/0315675 A1* | 10/2016 | Seok .................... H04B 7/0452 |

OTHER PUBLICATIONS

"International Application Serial No. PCT/US2016/019726, Written Opinion dated Jul. 22, 2016", 9 pgs.
Houngyuan, Zhang, et al., "HE-LTF Proposal", IEEE 802.11-15/0349, (Mar. 10, 2015), 8-29.

* cited by examiner

APPARATUS, COMPUTER READABLE MEDIUM, AND METHOD FOR ALIGNMENT OF LONG TRAINING FIELDS IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/153,615, filed Apr. 28, 2015, which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to alignment of long training fields. Some embodiments relate to extending a symbol size of the long training field or adding additional long training symbols to align long training fields of different users.

BACKGROUND

Efficient use of the resources of a wireless local-area network (WLAN) is important to provide bandwidth and acceptable response times to the users of the WLAN. However, often there are many devices trying to share the same resources and the devices may interfere with one another or may not be synchronized with one another. Additionally, it may be difficult for wireless devices to be aware of resources available to other wireless devices. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
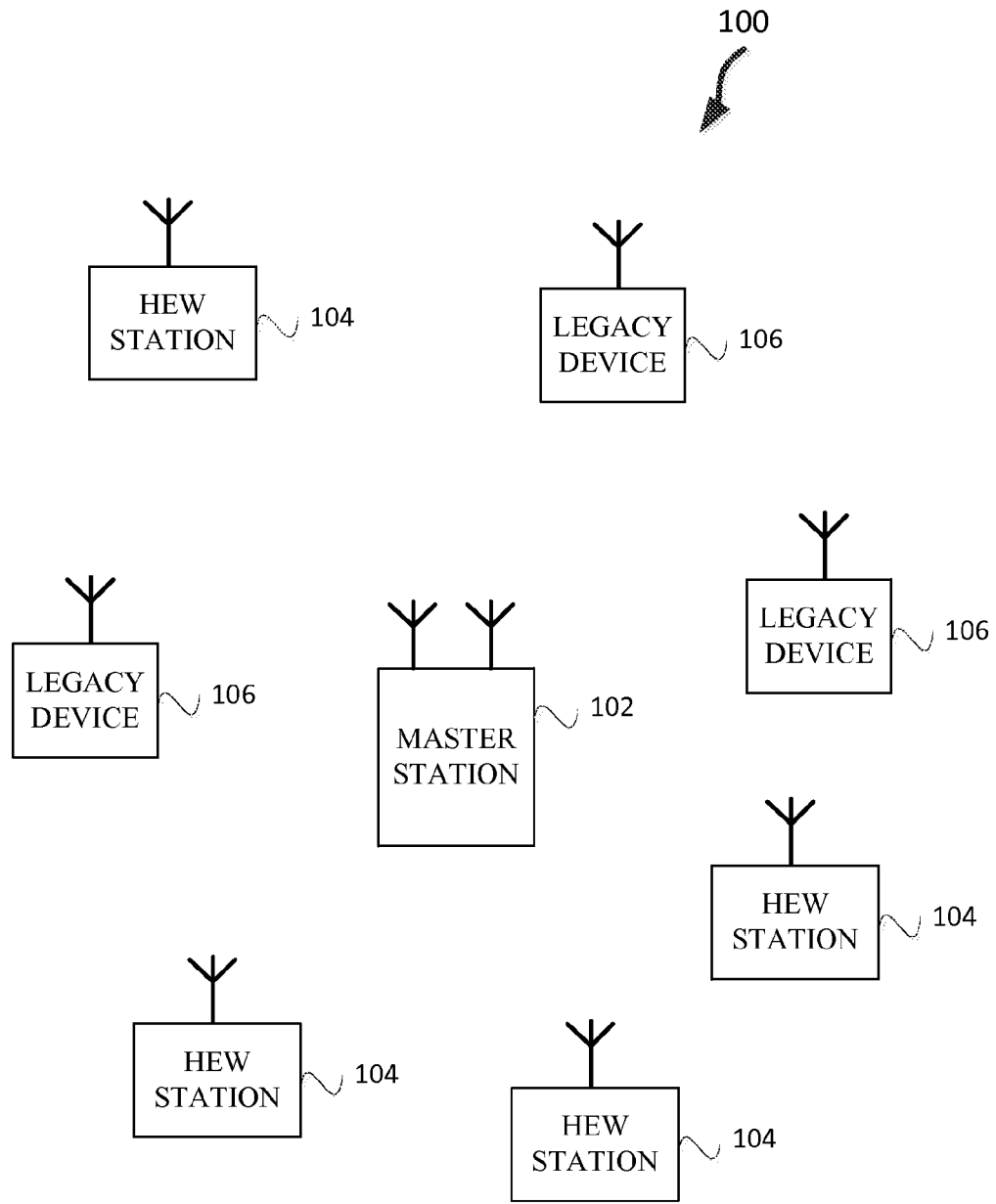
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include a master station 102, which may be an access point (AP), a plurality of high-efficiency wireless (HEW) (e.g., IEEE 802.11ax) stations 104 and a plurality of legacy (e.g., IEEE 802.11n/ac) devices 106.

The master station 102 may be an access point (AP) using the 802.11 to transmit and receive. The master station 102 may be a base station. The master station 102 may be a master station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW devices 104 may operate in accordance with 802.11ax or another standard of 802.11. The legacy devices 106 may operate in accordance with one or more of 802.11 a/g/ag/n/ac, or another legacy wireless communication standard. The HEW devices 104 may be high efficiency (HE) stations. The legacy devices 106 may be stations.

The HEW devices 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol.

The BSS 100 may operate on a primary channel and one or more secondary channels or sub-channels. The BSS 100 may include one or more APs 102. In accordance with embodiments, the master station 102 may communicate with one or more of the HEW devices 104 on one or more of the secondary channels or sub-channels or the primary channel. In example embodiments, the master station 102 communicates with the legacy devices 106 on the primary channel. In example embodiments, the master station 102 may be configured to communicate concurrently with one or more of the HEW devices 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a subchannel. The bandwidth of a subchannel may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.03 MHz, 2.5 MHz, 5 MHz and 10 MHz, or a combination thereof or another bandwidth that is less or equal to the available bandwidth, may also be used. In some embodiments the bandwidth of the subchannels are multiples of 26 (e.g., 26, 52, 104, etc.) tones that are spaced by 20 MHz or 256 tones subchannels. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams. In other embodiments, the master station 102, HEW device 104, and/or legacy device 106 may also implement different technologies such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In an OFDMA system (e.g. 802.11ax), an associated HEW device 104 may operate on a sub-channel, which may be 20 MHz, of the BSS 100 (that can operate, for example, at 80 MHz). The HEW device 104 may enter a power save mode, and upon coming out of power save mode, the HEW device 104 may need to re-synchronize with BSS 100 by receiving a beacon. If a beacon is transmitted only on the primary channel, then HEW device 104 needs to move and tune to the primary channel upon waking up to be able to receive beacons. Then the HEW device 104 needs to re-tune back to its operating subchannels, which may be 20 MHz, or it has to follow a handshake procedure to let master station 102 know of a new operating subchannel. The HEW device 104 may risk losing some frames during the channel switch, in example embodiments.

In example embodiments, the HEW device 104 and/or the master station 102 are configured to perform the methods and functions described in conjunction with FIGS. 1-11.

Figure 2:
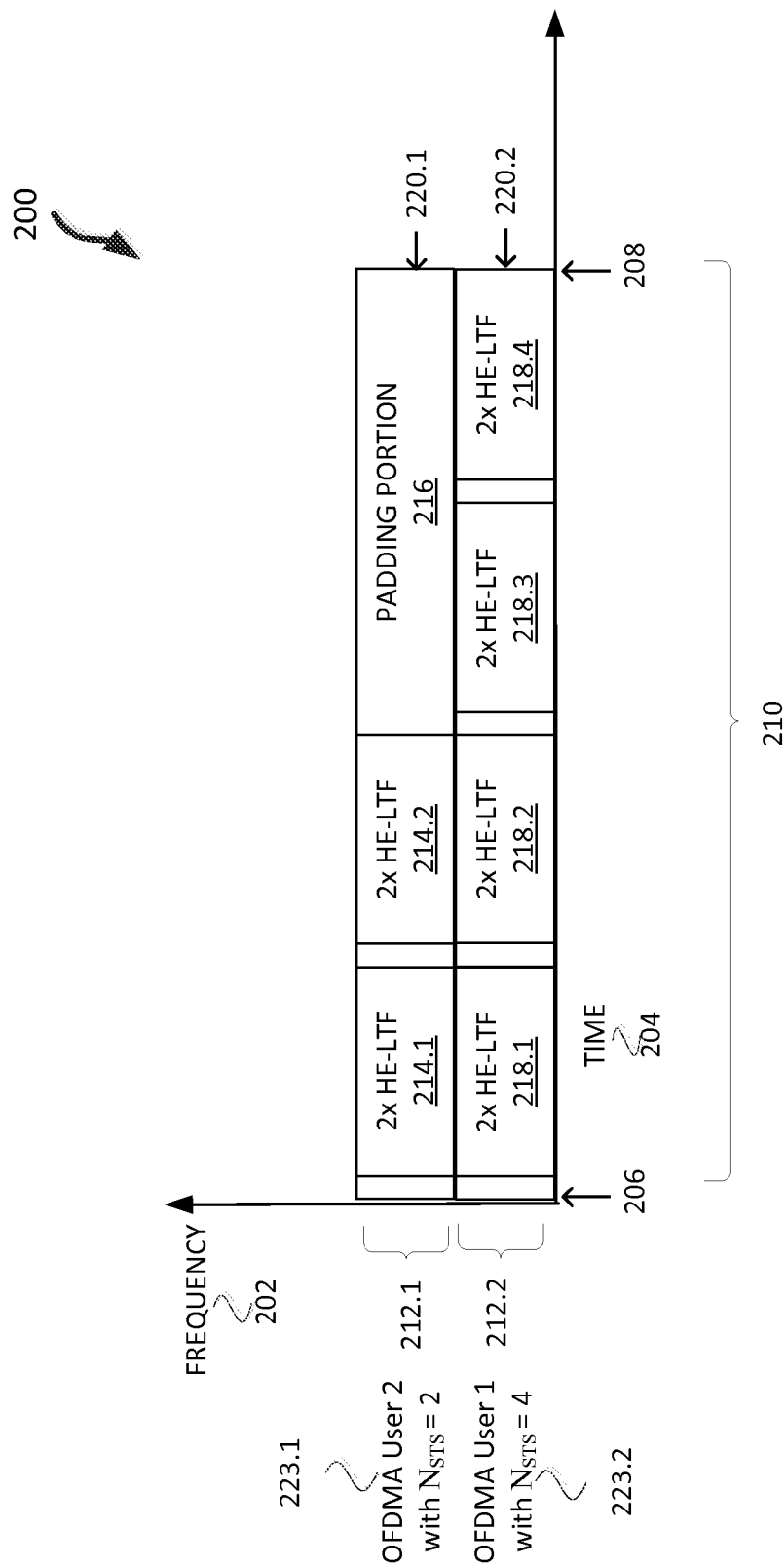
FIG. 2 illustrates a method for generating and transmitting high-efficiency (HE) PLCP protocol data units (HE-PPDU) in accordance with some embodiments.

FIG. 2 illustrates a method 200 for generating and transmitting high-efficiency (HE) PLCP protocol data units (HE-PPDU) in accordance with some embodiments. Illustrated in FIG. 2 is frequency 202 along a vertical axis and time 204 along a horizontal axis. The HE long training field (HE-LTF) sections 220 may be a portion of a HE PPDU. HE-LTF sections 220 of PPDUs are being transmitted on two channels, channel 212.1 and channel 212.2. A master station 102 may be transmitting the two HE preambles 220.1, 220.2. In some embodiments two HEW STAs 104 may be transmitting the two HE preambles 220.1, 220.2. OFDMA user 1 223.1 and OFDMA user 2 223.2 may either be transmitting the HE-LTF sections 220 or receiving the HE-LTF sections 220. For example, OFDMA user 1 223.1 with N space-time-streams (STS)=4 is the recipient or transmitter of HE preamble 220.2. OFDMA user 2 223.2 with N (STS)=2 is the recipient or transmitter of HE preamble 220.1. The HE preambles 220 are transmitted in accordance with OFDMA and/or MU-MIMO.

The master station 102 and HEW STA 104 may be configured to transmit the HE PPDUs so that the HE-LTF sections 220 start at the same point of time 204 and end at the same point of time 204 for all users. For example, both HE-LTF section 220.1 and HE-LTF section 220.2 begin at time 206 and end at time 208 with the same duration 210.

In some embodiments the HE-LTF section 220 symbol duration is 6.4 μs excluding a guard interval (GI). In some embodiments the HE-LTF section 220 symbol duration is 12.8 μs excluding GI. The HE-LTF section 220 symbol duration of 6.4 μs may be 2 times (2×) a legacy symbol duration. The HE-LTF section 220 symbol duration of 12.8 μs may be 4 times (4×) a legacy symbol duration.

2×HE long training field (HE-LTF) 214.1 and 2×HE-LTF 214.2 may be HE-LTFs. In some embodiments 2×HE-LTF 214.2 may be a duplicate of 2×HE-LTF 214.1. The 2× may indicate that the symbol length duration or length is twice as long as a legacy symbol length or duration such as IEEE 802.11ac. 2×HE-LTF 218 may be four HE-LTFs that are duplicates and transmitted at 2× the symbol length of a legacy communication standard.

Figure 3:
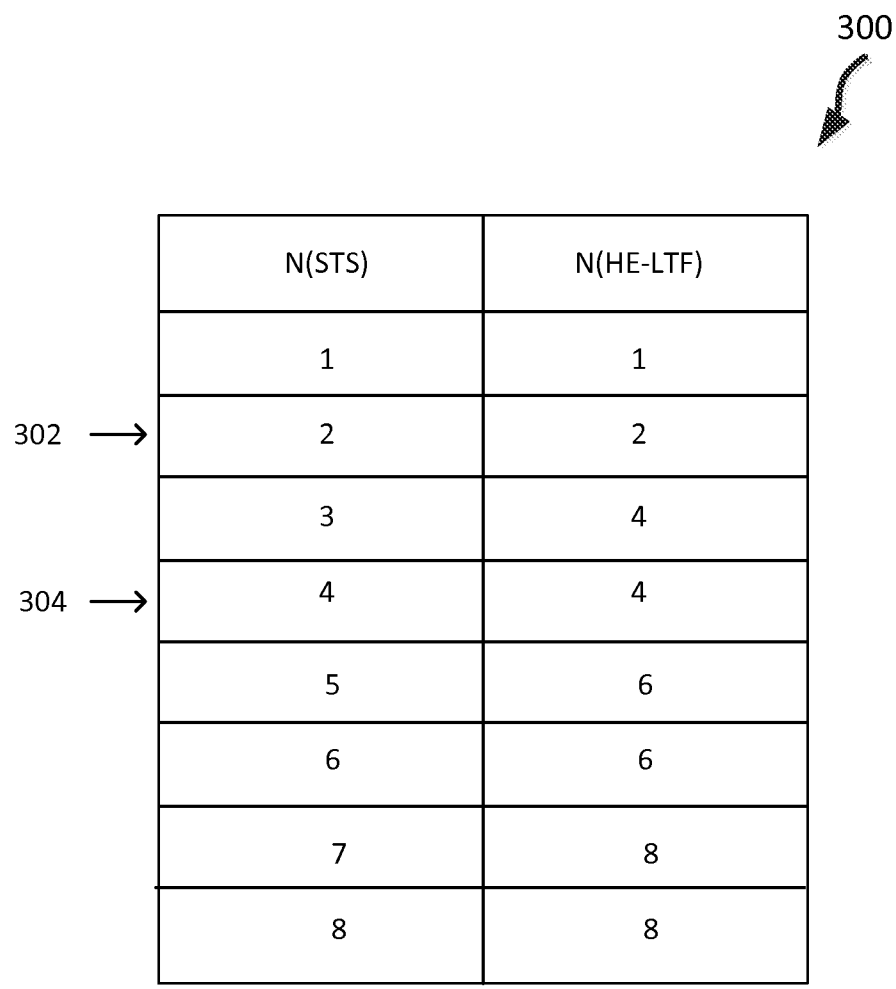
FIG. 3 illustrates a table of a minimum number of HE long-training fields (HE-LTFs) for a number of space-time streams (STSs) in accordance with some embodiments.

A minimum number of HE-LTFs may be determined by the number of STSs. FIG. 3 illustrates a table 300 of a minimum number of HE long-training fields (HE-LTFs) for a number of space-time streams (STSs) in accordance with some embodiments. For example, OFDMA user 2 223.2 of FIG. 2 has N(STS)=2, and according to table 300 at row 302, 2 N(HE-LTF) should be used for OFDMA user 2 223.2. OFDMA user 1 223.1 of FIG. 2 has N(STS)=4, so according to table 300 at row 304, 4 N(HE-LTFs) should be used for OFDMA user 1 223.1.

As illustrated there are only two users, but a different number of users may generate and transmit high-efficiency (HE) PLCP protocol data units (PPDU) (HE-PPDU). Because HE-LTF section 220.1 and HE-LTF section 220.2 may be different lengths due to a number of HE-LTFs 214, 218 or symbol duration differences, it may be that one of the HE-LTF sections 220 needs to be extended so that it starts at the same point of time 204 and ends at the same point of time 204 for all OFDMA users 223.

As illustrated in FIG. 2, HE-LTF section 220.1 includes a padding portion 216 so that it starts at the same point of time 204 and ends at the same point of time 204 for all OFDMA users 223.

Figure 4:
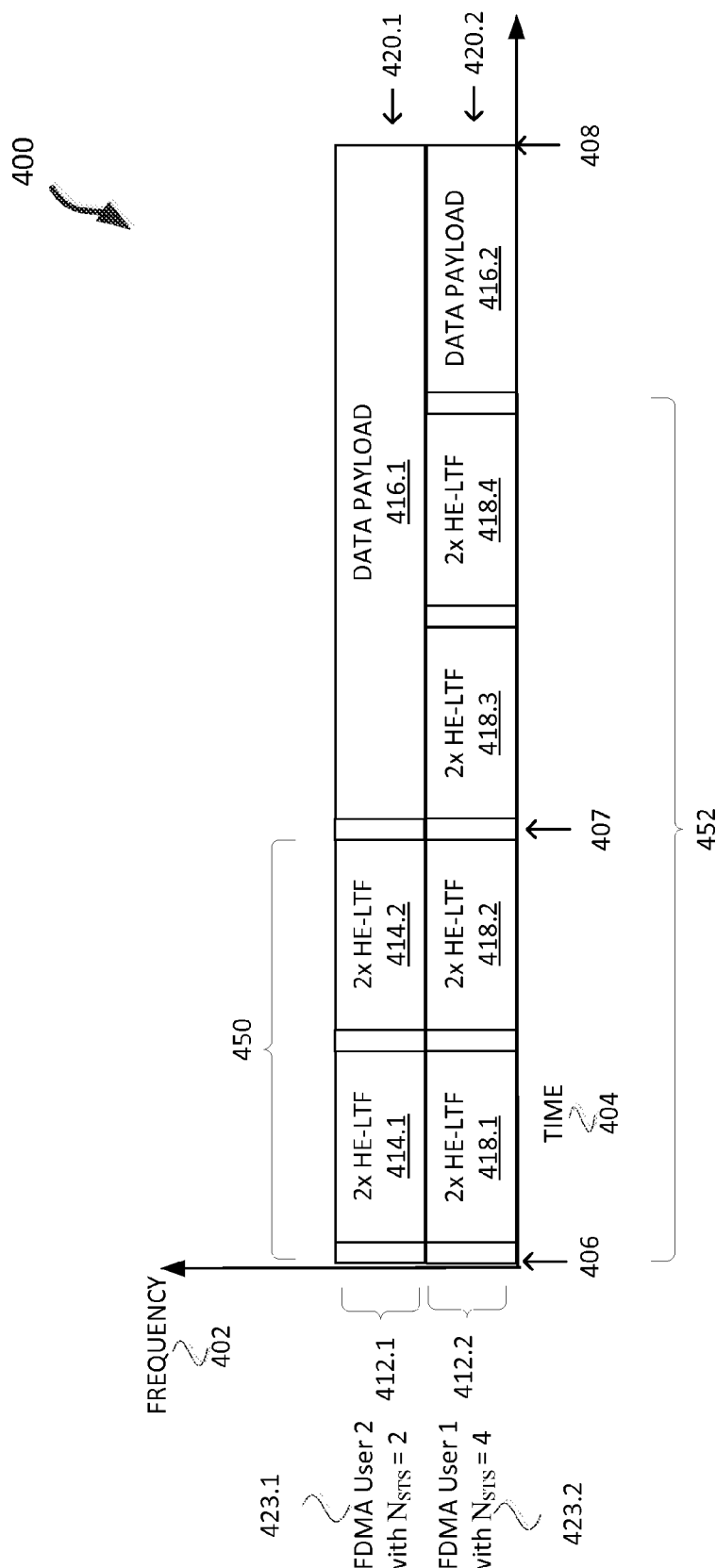
FIG. 4 illustrates a misalignment in accordance with some embodiments.

FIG. 4 illustrates a misalignment 400 in accordance with some embodiments. Illustrated in FIG. 4 is time 404 along a horizontal axis and frequency 402 along a vertical axis. The HE-PPDUs 420 are being transmitted on channels 412 in accordance with OFDMA and/or MU-MIMO. The HE-PPDUs 420 are misaligned because the HE-LTF sections 450, 452 do not start and end at the same time 404. HE-LTF section 450 starts at time 406 and ends at time 407 while HE-LTF section 452 starts at time 406, but ends at 452. The data payload 416.1, 416.2 may be a data payloads. 2×HE-LTF 414 and 2×HE-LTF 418 may be HE-LTFs. OFDMA user 1 423.1 and OFDMA user 2 423.2 may be either receivers or transmitters of the HE-PPDUs 420. In some embodiments, in OFDMA, if different resource blocks have a different number of HE-LTFs, and if HE-LTFs are compressed, the fast fourier transform (FFT) window across blocks will not be aligned and will cause non-orthogonality.

Figure 5:
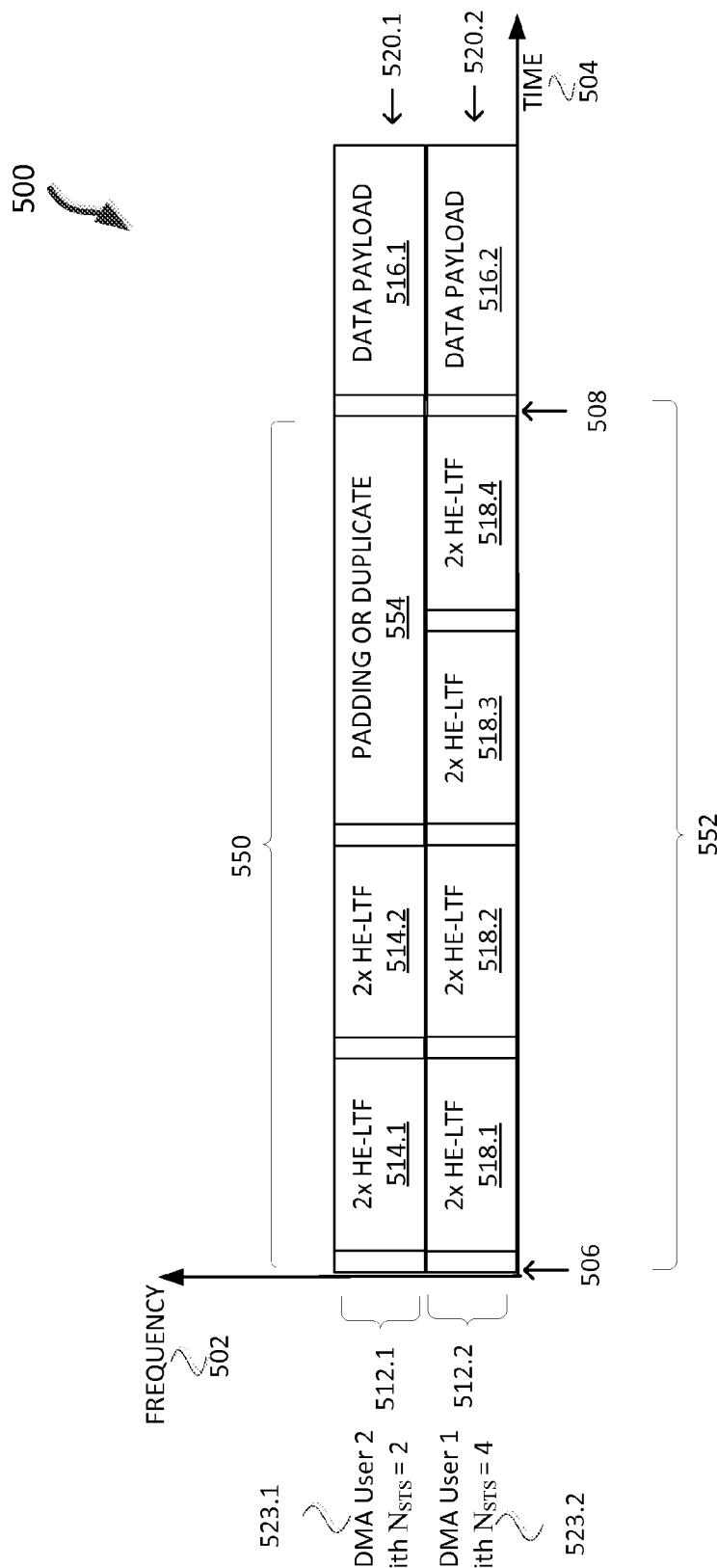
FIG. 5 illustrates a required alignment in accordance with some embodiments.

FIG. 5 illustrates a required alignment 500 in accordance with some embodiments. Illustrated in FIG. 5 is time 504 along a horizontal axis and frequency 502 along a vertical axis. The HE-PPDUs 520 are being transmitted on channels 512 in accordance with OFDMA and/or MU-MIMO. The HE-PPDUs 520 have the required alignment 500 because the HE-LTF sections 550, 552 start and end at the same time 504. Both HE-LTF section 550 and HE-LTF section 552 start at time 506 and end at time 508. The data payload

516.1, 516.2 may be a data payloads. 2×HE-LTF 514 and 2×HE-LTF 518 may be HE-LTFs. OFDMA user 1 523.1 and OFDMA user 2 523.2 may be either receivers or transmitters of the HE-PPDUs 520. Padding or duplicate 554 may be either padding or duplication of a previous 2×HE-LTF 514.

Figure 6:
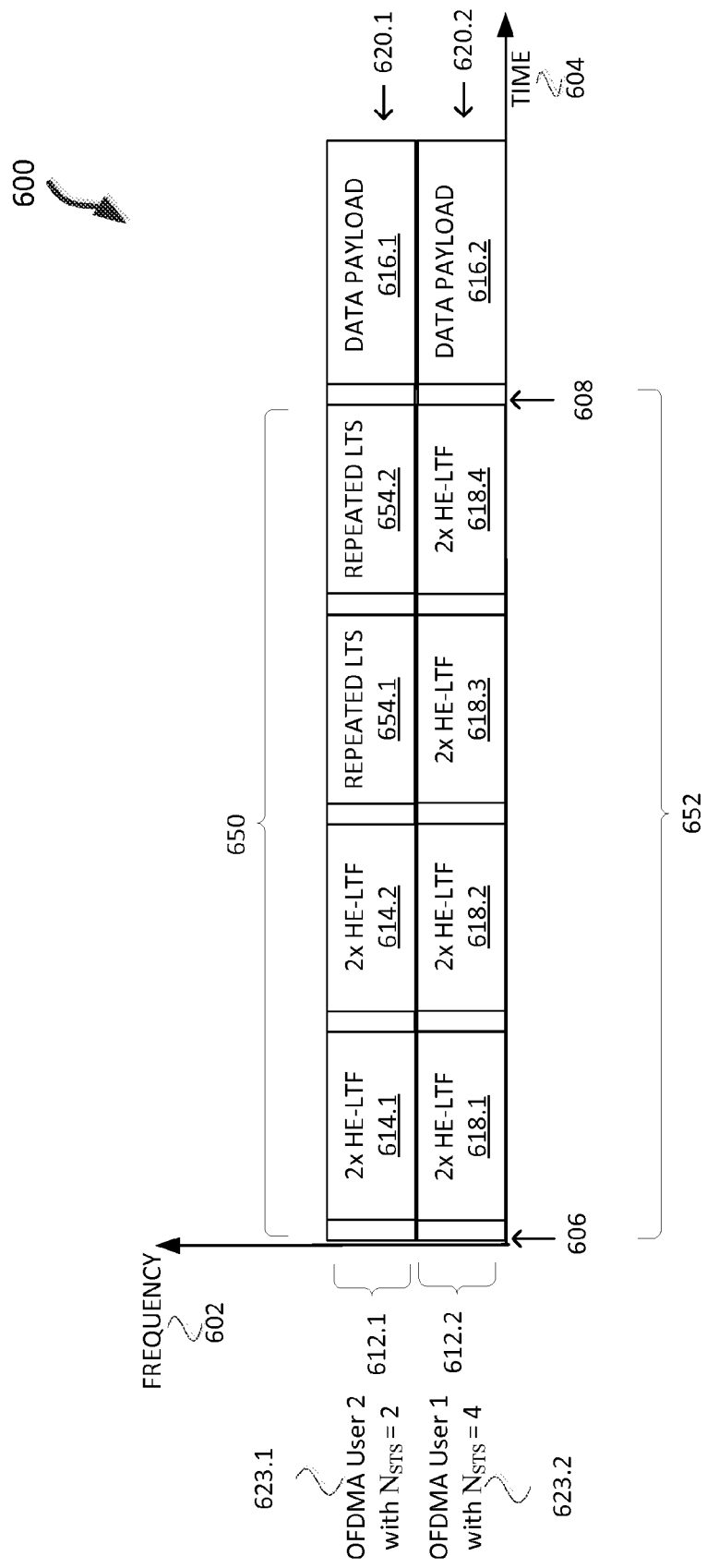
FIG. 6 illustrates a required alignment in accordance with some embodiments.

FIG. 6 illustrates a required alignment 600 in accordance with some embodiments. Illustrated in FIG. 6 is time 604 along a horizontal axis and frequency 602 along a vertical axis. The HE-PPDUs 620 are being transmitted on channels 612 in accordance with OFDMA and/or MU-MIMO. The HE-PPDUs 620 have the required alignment 600 because the HE-LTF sections 650, 652 start and end at the same time 604. Both HE-LTF section 650 and HE-LTF section 652 start at time 606 and end at time 608. The data payload 616.1, 616.2 may be a data payloads. 2×HE-LTF 614 and 2×HE-LTF 618 may be HE-LTFs. OFDMA user 1 623.1 and OFDMA user 2 623.2 may be either receivers or transmitters of the HE-PPDUs 620. Repeated LTS 654.1 and repeated LTS 654.2 may be repeated long training symbols from the 2×HE-LTF 614 for the required alignment 600. As table 300 illustrates the number of repeated LTSs 654 may depend on N(STS) for OFDMA user 1 623.1 and OFDMA user 2 623.2.

Repeated LTS 654.1 and repeated LTS 654.2 may be repeated long training symbols from the 2×HE-LTFs 614 with an overlay on top so that the receiver can make an estimate over both channels. For example, the overlay may be a P-Matrix. In some embodiments, repeated LTS 654.1 may get a 1 overlaid over the full sequence of bits of repeated LTS 654.1, and repeated LTS 654.2 may get a −1 overlaid over the full sequence of bits of repeated LTS 654.2. Repeated LTS 654.1 and repeated LTS 654.2 may be the same sequence with a P-matrix overlay. OFDMA user 2 623.1 may have a P-matrix that has 4 values to overlay, e.g. [1 −1 −1 −1]. This may enable the receiver to compute the channel weights. In some embodiments a normal length 4 P-matrix may be used. In some embodiments the P-matrix is repeated for repeated LTSs 654. For example, the P-matrix for 2×HE-LTF 614.1 and 2×HE-LTF 614.2 may be [1 −1], and the P-matrix for 2×HE-LTF 614.1, 2×HE-LTF 614.2, repeated LTS 654.1 and repeated LTS 654.2 may be [−1 1 −1 1]. In some embodiments other P-matrixes may be used. Repeated LTS 654.1 and repeated LTS 654.2 may be different sequences from each other and different from other long training symbols such as 2×HE-LTF 614.

Figure 7:
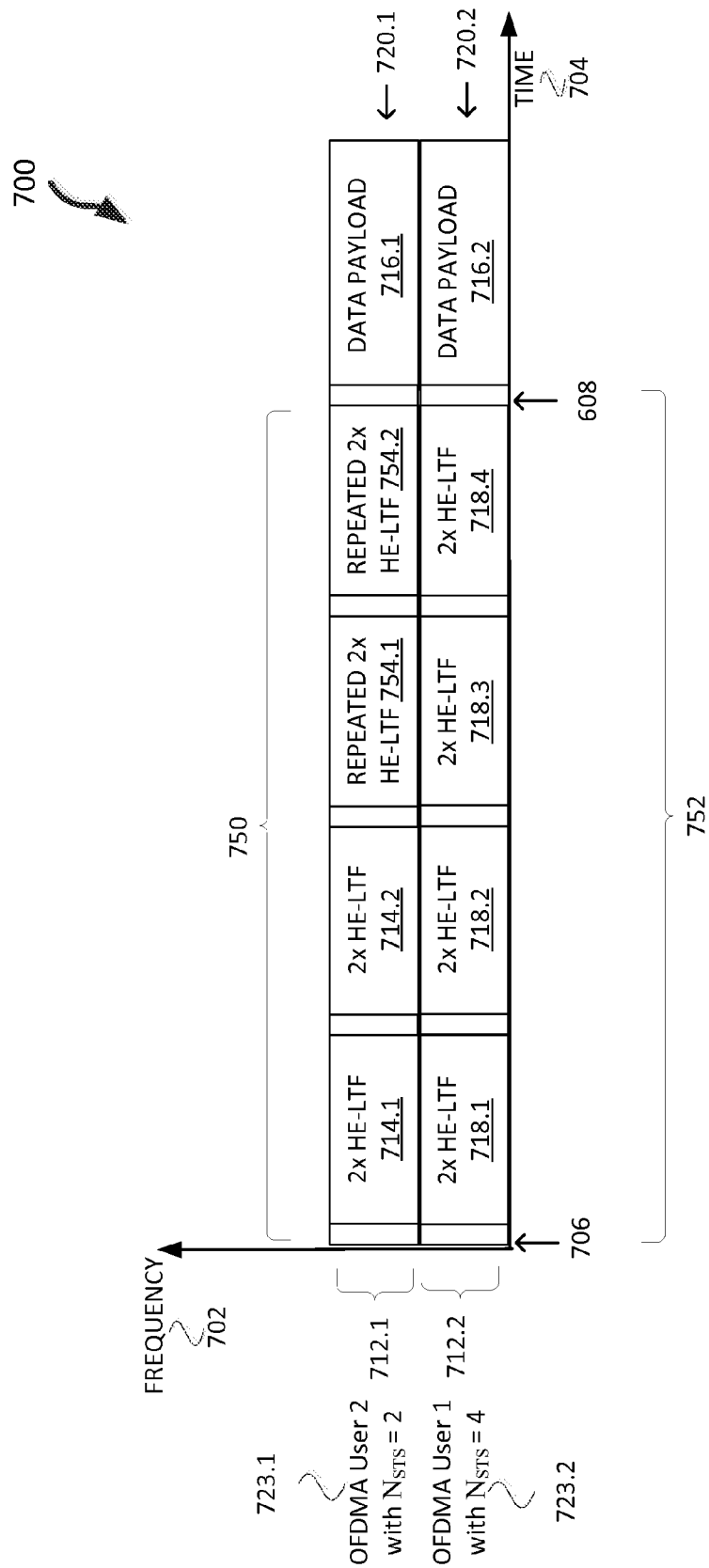
FIG. 7 illustrates a required alignment in accordance with some embodiments.

FIG. 7 illustrates a required alignment 700 in accordance with some embodiments. Illustrated in FIG. 7 is time 704 along a horizontal axis and frequency 702 along a vertical axis. The HE-PPDUs 720 are being transmitted on channels 712 in accordance with OFDMA and/or MU-MIMO. The HE-PPDUs 720 have the required alignment 700 because the HE-LTF sections 750, 752 start and end at the same time 704. Both HE-LTF section 750 and HE-LTF section 752 start at time 706 and end at time 708. The data payload 716.1, 716.2 may be a data payloads. 2×HE-LTF 714 and 2×HE-LTF 718 may be HE-LTFs. OFDMA user 1 723.1 and OFDMA user 2 723.2 may be either receivers or transmitters of the HE-PPDUs 720. Repeated 2×HE-LTF 754.1 and repeated 2×HE-LTF 754.2 may be repeated 2×HE-LTF 714 for the required alignment 700.

Repeated 2×LTF 754.1 and repeated 2×LTF 754.2 may be repeated long training symbols from the 2×HE-LTF 714 with an overlay on top so that the receiver can make an estimate over both channels. For example, the overlay may be a P-Matrix. In some embodiments, repeated 2×LTF 754.1 may get a 1 overlaid over the full sequence of 2×LTF 754.1, and repeated 2×LTF 754.2 may get a −1 overlaid over the full sequence of 2×LTF 754.2. Repeated LTF 754.1 and repeated LTF 754.2 may be the same sequence with a P-matrix overlay. OFDMA user 2 723.1 may have a P-matrix that has 4 values to overlay, e.g. [1 −1 −1 −1]. This may enable the receiver to compute the channel weights. In some embodiments a normal length 4 P-matrix may be used. In some embodiments the P-matrix is repeated for repeated 2×LTFs 754. For example, the P-matrix for 2×HE-LTF 714.1 and 2x HE-LTF 714.2 may be [1 −1], and the P-matrix for 2×HE-LTF 714.1, 2×HE-LTF 714.2, repeated 2×LTF 754.1 and repeated 2×LTF 754.2 may be [−1 1 −1 1]. In some embodiments other P-matrixes may be used. Repeated 2×LTF 654.1 and repeated 2×LTF 754.2 may be different sequences from each other and different from other long training symbols such as 2×HE-LTF 714.

Figure 8:
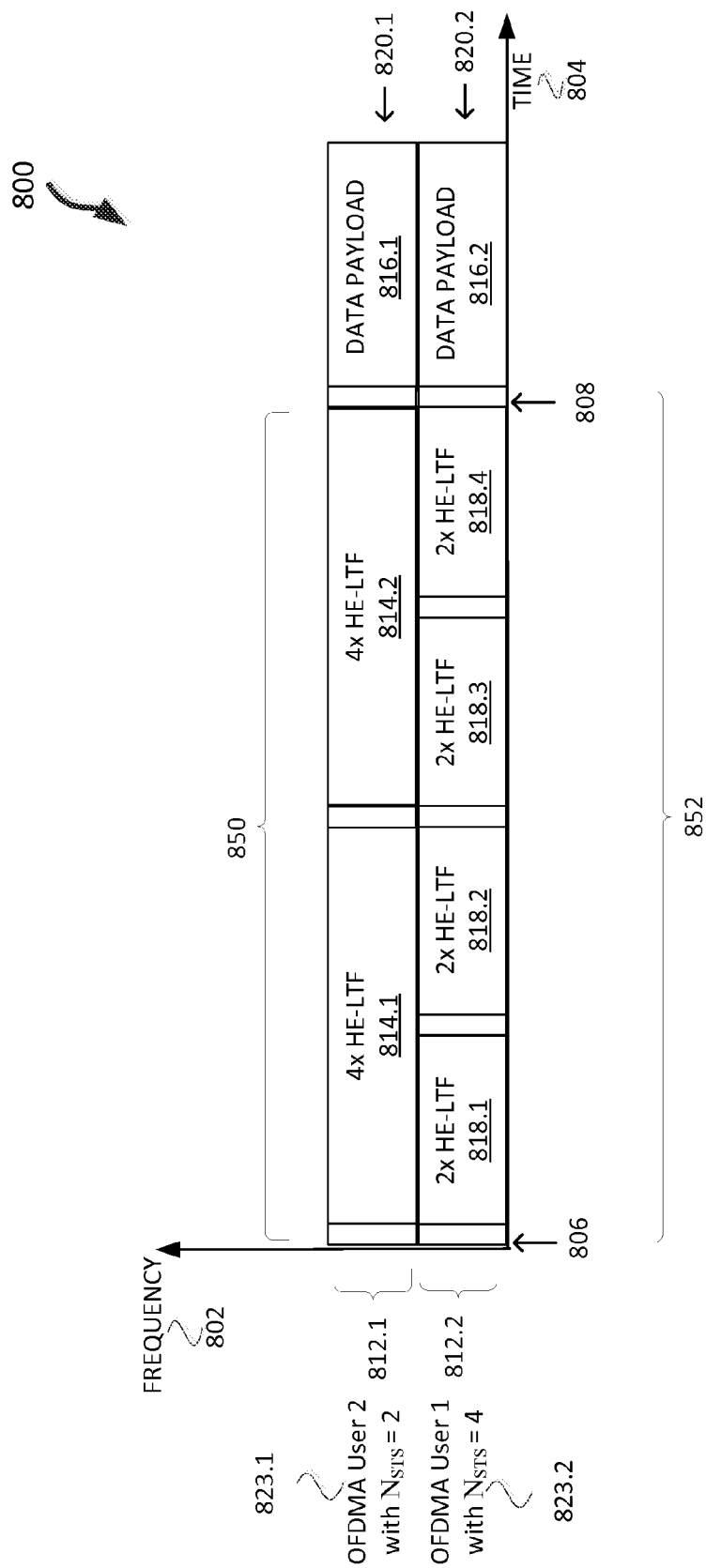
FIG. 8 illustrates a required alignment in accordance with some embodiments.

FIG. 8 illustrates a required alignment 800 in accordance with some embodiments. Illustrated in FIG. 8 is time 804 along a horizontal axis and frequency 802 along a vertical axis. The HE-PPDUs 820 are being transmitted on channels 812 in accordance with OFDMA and/or MU-MIMO. The HE-PPDUs 820 have the required alignment 800 because the HE-LTF sections 850, 852 start and end at the same time 804. Both HE-LTF section 850 and HE-LTF section 852 start at time 806 and end at time 808. The data payloads 816.1, 816.2 may be a data payloads. 4×HE-LTF 814 and 2×HE-LTF 818 may be HE-LTFs. OFDMA user 1 823.1 and OFDMA user 2 823.2 may be either receivers or transmitters of the HE-PPDUs 820. The 4×HE-LTF 814 were extended to 4× the symbol length of the legacy communications standard to extend the HE-LTF section 850 to start and end at the same times 804 as HE-LTF section 852.

In some embodiments 4×HE-LTF 814.2 may be a same sequence as 4×HE-LTF 814.1 with a different overlay. In some embodiments 4×HE-LTF 814.2 may be a different sequence than 4×HE-LTF 814.1. 4×LTF 854.2 may be repeated long training symbols from the 4×HE-LTF 814.1 with an overlay on top so that the receiver can make an estimate over both channels. For example, the overlay may be a P-Matrix. In some embodiments, 4×LTF 814.1 may get a 1 overlaid over the full sequence of 4×LTF 814.1, and 4×LTF 814.2 may get a −1 overlaid over the full sequence of 4×LTF 814.2. 4×LTF 814.1 and 4×LTF 814.2 may be the same sequence with a P-matrix overlay. OFDMA user 2 812.1 may have a P-matrix that has 4 values to overlay, e.g. [1 −1 −1 −1]. This may enable the receiver to compute the channel weights. In some embodiments a normal length 4 P-matrix may be used. In some embodiments the P-matrix is repeated for 4×LTFs 814. 4×LTF 814.1 and 4×LTF 814.2 may be different sequences from each other and different from other long training symbols.

Figure 9:
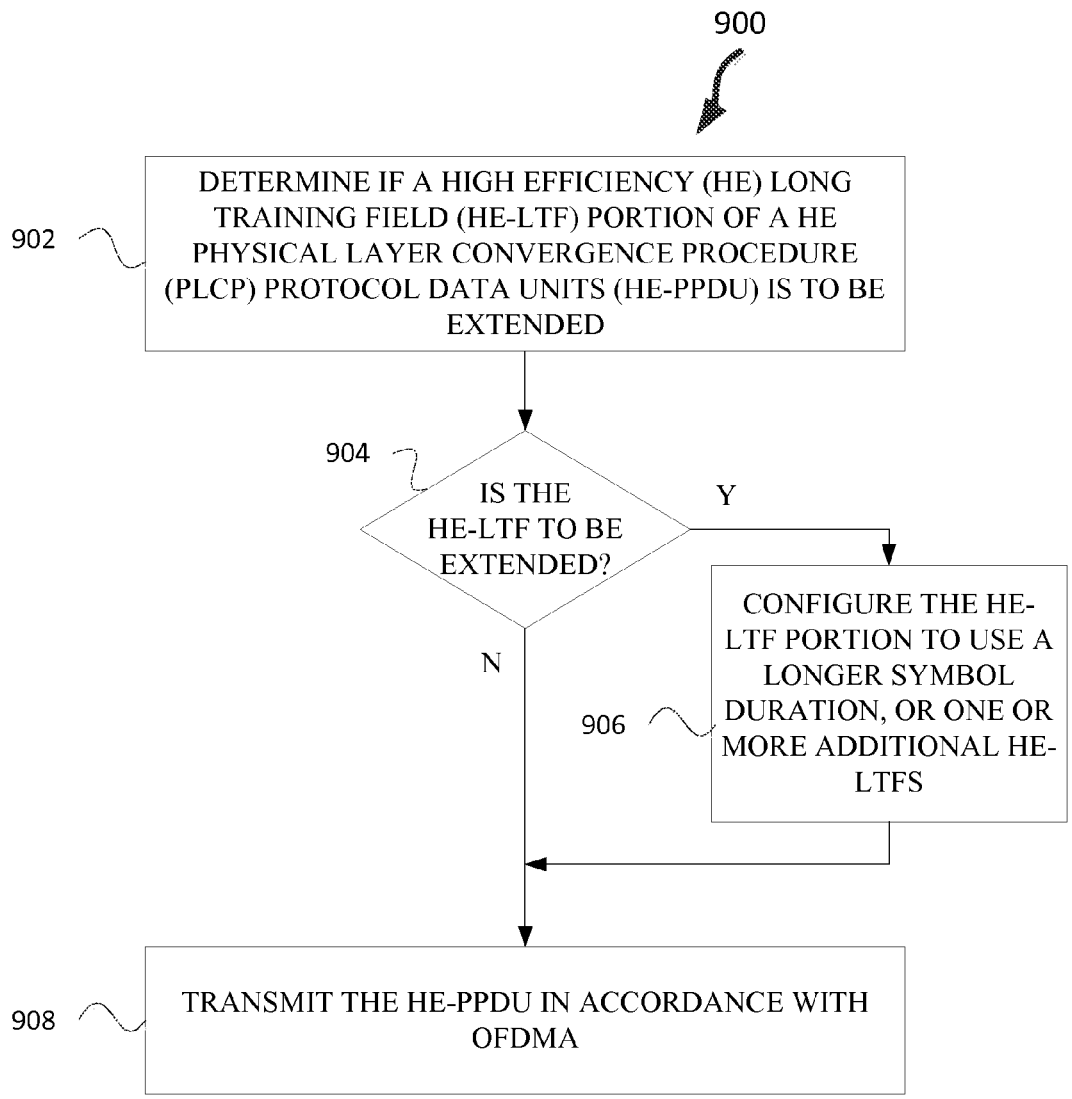
FIG. 9 illustrates a method for alignment of long-training fields in accordance with some embodiments.

FIG. 9 illustrates a method 900 for alignment of long-training fields in accordance with some embodiments. The method 900 may begin at operation 902 with determining if a HE-LTF portion of a HE-PPDU is to be extended. For example, a master station 102 may be transmitting HE-PPDUs to one or more HEW STAs 104. The master station 102 may be transmitting HE-PPDUs as part of a transmission opportunity. The HE-LTF section of the HE-PPDU may be required to start at the same point in time and to end at the same point in time across all the HEW STAs 104 users.

The number of the HE-LTFs may be determined based on N(STS) and table 300. The symbol duration may be 6.4 µs or 12.8 µs. The symbol duration may be 2× or 4× the symbol duration of legacy communication standard. The master station 102 may determine which is the longest HE-LTF section and then determine that a HE-LTF section is to be extended if it is shorter than the longest HE-LTF section.

For an uplink multiuser opportunity, a HEW STA 104 may determine whether the HE-LTF section it is transmitting to another HEW STA 104 or master station 102 based on signaling received from the master station 102. For example the master station 102 may include information in a trigger frame that indicates whether a HEW STA 104 needs to extend the HE-LTF portion of the HE-PPDU. In one example, the HEW STA 104 decodes the trigger frame which includes a resource allocation for each of the HEW STA 104 participating in the transmission opportunity. The HEW STA 104 may then be able to determine the length of the other HE-LTF portions that the other HEW STA 104 will transmit based on the trigger frame.

The method 900 may continue at operation 904 with is the HE-LTF to be extended. If the HE-LTF is to be extended then the method 900 continues at operation 906 with configuring the HE-LTF portion to use a longer symbol duration, or configuring the HE-LTF portion to use one or more additional HE-LTFs. For example, the HE-LTF may be extended as disclosed in conjunction with FIG. 5-8 where repeated LTSs may be used or a longer symbol duration may be used to extend the HE-LTF portion of an HE-PPDU. The method 900 continues at operation 908.

If at operation 904, the HE-LTF is not to be extended then the method 900 continues at operation 908 with transmitting the HE-PPDU in accordance with OFDMA. In some embodiments the HE-PPDU is transmitted in accordance with MU-MIMO and OFDMA.

In some embodiments the repeated LTS enables the receiver to do more averaging of the channel estimates, improving the post-equalizer SNR, and thus improves packet error rate (PER). In some embodiments repeating LTSs or HE-LTFs or extending the symbol duration does not significantly increase the overhead incurred by the receiver while lowering the PER. In some embodiments, the method 900 requires the receiver of the HE-PPDU to do additional channel estimation and to do averaging. However, a HEW STA 104 and/or master station 102 receiver may be capable of doing so because the legacy portion of the preamble consists of two LTS's. In some embodiments method 900 utilizes existing hardware of the master station 102 and/or HEW STA 104 while providing the averaging gain.

Figure 10:
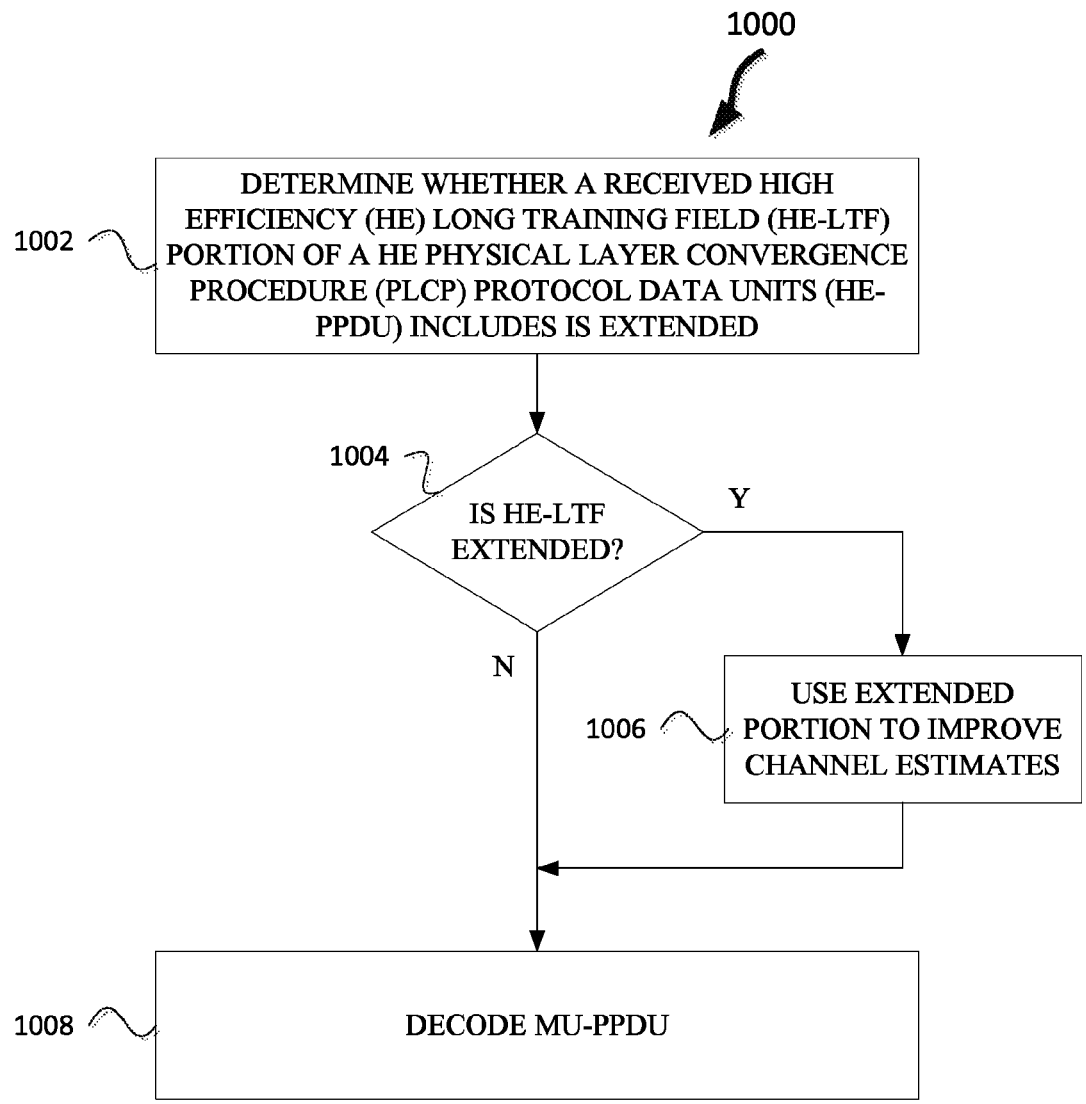
FIG. 10 illustrates a method for receiving an aligned long-training field in accordance with some embodiments.

FIG. 10 illustrates a method 1000 for receiving an aligned long-training field in accordance with some embodiments. The method 1000 may begin with determining whether a received HE-LTF portion of a HE-PPDU is extended. The receiver which may be a master station 102 or HEW STA 104 may determine the HE-LTF portion is extended from signal fields of the HE-PPDU or from a prior trigger frame. For example, in a downlink, a HEW STA 104, e.g. OFDMA user 2 723.2 or 823.2, decodes signal fields (not illustrated in FIGS. 7 and 8) prior to the HE-LTF portion (FIG. 7, 750, 752) (FIG. 8, 850, 852). OFDMA user 2 723.2, 823.2 may then determine that there are four 2× Symbol-HE-LTF (718, 818) for OFDMA user 1 723.2, 823.2, while OFDMA user 2 723.2, 823.2 only needs two HE-LTF 714, 814. Therefore, OFDMA user 2 723.2, 823.2, determines that there has been a need to align the HE-LTFs 714, 814 at the transmitter side, and hence would know the preamble carriers repeated LTS (FIG. 7, 754) or extended duration symbols (FIG. 8, 814).

The method 1000 continues at operation 1004 with is HE-LTF extended. If the HE-LTF is extended, then the method 1000 continues at operation 1006 with using extended portion to improve channel estimates. For example, the receiver utilizes the extended HE-LTF to further improve its channel estimates. The gain of averaging channel estimates over N symbols is known to be due to the reduced noise variance to σ2/N instead of σ2. Equivalently, the total noise after equalizer becomes σ2(1+1/N) instead of 2σ2, which is the case for only one LTS. Any improvement in post-equalizer SNR may improve performance, and thus increases overall efficiency of the network.

In some embodiments, channel smoothing or data-driven equalizers do not provide improvement for pre-coded signals or "early" symbols of the packet, respectively. In some embodiments with the longer symbol duration (FIG. 8), the receiver cannot perform averaging, but it obtains channel estimates on each and every OFDM subcarrier, and hence there will not be a need to do interpolation. Since there is a known performance loss due to interpolation, this alternative method can also improve performance.

The method 1000 may continue at operation 1008 with decoding MU-PPDU. The receiver may complete the decoding of the MU-PPDU which may be improved if the HE-LTF portion is extended.

Figure 11:
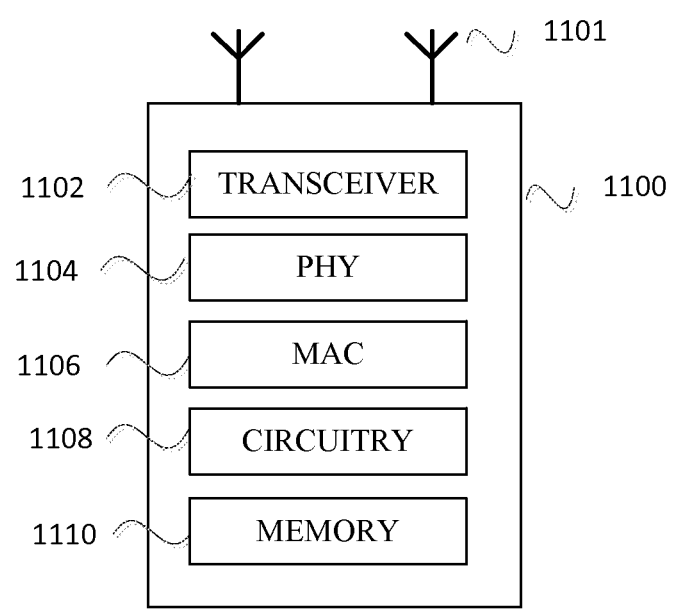
FIG. 11 illustrates a HEW station in accordance with some embodiments.

FIG. 11 illustrates a HEW station 1100 in accordance with some embodiments. HEW station 1100 may be a HEW compliant device that may be arranged to communicate with one or more other HEW stations, such as HEW stations 104 (FIG. 1) or master station 102 (FIG. 1) as well as communicate with legacy devices 106 (FIG. 1). The HEW station 1100 may be a master station 102 or access point. HEW stations 104 and legacy devices 106 may also be referred to as HEW devices and legacy stations (STAs), respectively. HEW station 1100 may be suitable for operating as access point 102 (FIG. 1) or an HEW station 104 (FIG. 1). In accordance with embodiments, HEW station 1100 may include, among other things, a transmit/receive element 1101 (for example an antenna), a transceiver 1102, physical layer (PHY) circuitry 1104, and medium-access control layer circuitry (MAC) 1106. PHY 1104 and MAC 1106 may be HEW compliant layers and may also be compliant with one or more legacy IEEE 802.11 standards. MAC 1106 may be arranged to configure physical protocol data units (PPDUs) and arranged to transmit and receive PPDUs, among other things. HEW station 1100 may also include other circuitry 1108 and memory 1110 configured to perform the various operations described herein. The circuitry 1108 may be coupled to the transceiver 1102, which may be coupled to the transmit/receive element 1101. While FIG. 11 depicts the circuitry 1108 and the transceiver 1102 as separate components, the circuitry 1108 and the transceiver 1102 may be integrated together in an electronic package or chip.

In some embodiments, the MAC 1106 may be arranged to contend for a wireless medium during a contention period to receive control of the medium for the HEW control period and configure an HEW PPDU. In some embodiments, the MAC 1106 may be arranged to contend for the wireless medium based on channel contention settings, a transmitting power level, and a clear channel assessment (CCA) level.

The PHY 1104 may be arranged to transmit the HEW PPDU. The PHY 1104 may include circuitry for modulation/demodulation, upconversion/downconversion, filtering, amplification, etc. In some embodiments, the circuitry 1108 may include one or more processors. The circuitry 1108 may be configured to perform functions based on instructions being stored in a RAM or ROM, or based on special purpose circuitry.

In some embodiments, the circuitry 1108 may be configured to perform one or more of the functions described herein in conjunction with FIGS. 1-11 and disclosed herein.

In some embodiments, two or more antennas 1101 may be coupled to the PHY 1104 and arranged for sending and receiving signals including transmission of the HEW packets. The HEW station 1100 may include a transceiver 1102 to transmit and receive data such as HEW PPDU and packets that include an indication that the HEW station 1100 should adapt the channel contention settings according to settings included in the packet. The memory 1110 may store information for configuring the other circuitry to perform operations for configuring and transmitting HEW packets and performing the various operations described herein in conjunction with FIGS. 1-11.

In some embodiments, the HEW station 1100 may be configured to communicate using OFDM communication signals over a multicarrier communication channel. In some embodiments, HEW station 1100 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect as they may also be suitable to transmit and/or receive communications in accordance with other techniques and standards. In some embodiments, the HEW station 1100 may use 4× symbol duration of 802.11n or 802.11ac.

In some embodiments, an HEW station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point 102, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas 1101, a graphics processor, an application processor, speakers, and other mobile device elements. The display may be an LCD screen including a touch screen.

The antennas 1101 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1101 may be effectively separated to take advantage of spatial diversity and the different channel characteristics that may result.

Although the device 1100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1100 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency (HE) wireless local-area network (HEW) device. The apparatus including transceiver circuitry and processing circuitry configured to determine if a HE long training field (HE-LTF) portion of a HE physical layer convergence procedure (PLCP) protocol data unit (HE-PPDU) is to be extended, and if the HE-LTF portion is to be extended, configure the HE-LTF portion to use a longer symbol duration, or one or more additional HE-LTFs. The transceiver circuitry and processing circuitry is further configured to transmit the HE-PPDU in accordance with orthogonal frequency division multiple access (OFDMA).

In Example 2, the subject matter of Example 1 can optionally include where the HE-LTF portion is to start at a same start time and end at a same end time as one or more other HE-LTF portions of one or more other HE-PPDUs.

In Example 3, the subject matter of Example 1 or Example 2 can optionally include where the HE-LTF portion is to be extended if a HE-LTF portion of the one or more other HE-PPDUs has a longer duration than the HE-LTF portion of the HE-PPDU.

In Example 4, the subject matter of Example 3 can optionally include where the HE-LTF portion is to be extended to have a same duration as a longest duration of the HE-LTF portion of the one or more other HE-PPDUs.

In Example 5, the subject matter of any of Examples 1-4 can optionally include the transceiver circuitry and processing circuitry are configured to determine the start time and the end time based on a received trigger frame.

In Example 6, the subject matter of any of Examples 1-5 can optionally include where the transceiver circuitry and processing circuitry are configured to determine a number of long training symbols to generate for the HE-LTF portion based on a number of space time streams allocated to a HEW device to which the HE-PPDU is to be transmitted.

In Example 7, the subject matter of any of Examples 1-6 can optionally include where the transceiver circuitry and processing circuitry are further configured to transmit the HE-PPDU in accordance with multiple-user multiple-input multi-output (MU-MIMO).

In Example 8, the subject matter of any of Examples 1-7 can optionally include where the transceiver circuitry and processing circuitry are further configured to generate a resource allocation comprising a channel allocation, a duration, and a number of space-time-streams, and determine to extend the HE-LTF portion based on the number of space-time-streams allocated to a HEW device to which the HE-PPDU is to be transmitted.

In Example 9, the subject matter of any of Examples 1-8 can optionally include where the longer symbol duration is at least one from the following group: 12.8 µs, 2 times a symbol duration of another HE-LTF portion of one or more other HE-PPDUs, and 4 times a symbol duration of a legacy standard.

In Example 10, the subject matter of any of Examples 1-9 can optionally include where the transceiver circuitry and processing circuitry are further configured to determine to use the longer symbol duration or to repeat a HE-LTF field based on a performance of a second HEW device, and transmit the HE-PPDU in accordance with OFDMA to the second HEW device.

In Example 11, the subject matter of any of Examples 1-10 can optionally include where the HEW device is one from the following group: a master station, an access point, a station, and a HEW station.

In Example 12, the subject matter of any of Examples 1-11 can optionally include where the a one or more additional HE-LTFs are one from the following group: duplicates of other HE-LTFs of the HE-LTF portion, duplicates of other HE-LTF fields of the HE-LTF portion with a different overlay, and different sequences from other HE-LTF fields of the HE-LTF portion.

In Example 13, the subject matter of any of Examples 1-12 can optionally include memory coupled to the transceiver circuitry and processing circuitry; and one or more antennas coupled to the transceiver circuitry and processing circuitry.

Example 14 is a method performed by a high-efficiency wireless local-area network (HEW) device. The method including determining if a HE long training field (HE-LTF) portion of a HE physical layer convergence procedure (PLCP) protocol data unit (HE-PPDU) is to be extended. The method further including if the HE-LTF portion is to be extended, configuring the HE-LTF portion to use a longer symbol duration, or one or more additional HE-LTFs. And, the method including transmitting the HE-PPDU in accordance with orthogonal frequency division multiple access (OFDMA).

In Example 15, the subject matter of Example 14 can optionally include where the HE-LTF portion is to start at a same start time and end at a same end time as one or more other HE-PPDUs.

In Example 16, the subject matter of Examples 14 or 15 can optionally include where the HE-LTF portion is to be extended if a HE-LTF portion of the one or more other HE-PPDUs has a longer duration than the HE-LTF portion of the HE-PPDU.

In Example 17, the subject matter of any of Examples 14-16 can optionally include where the HE-LTF portion is to be extended to have a same duration as a longest duration of the HE-LTF portion of the one or more other HE-PPDUs.

In Example 18 is an apparatus of a high-efficiency (HE) wireless local-area network (HEW) device. The HEW device comprising circuitry configured to receive a HE long training field (HE-LTF) portion of a HE physical layer convergence procedure (PLCP) protocol data units (HE-PPDU); determine if the HE-LTF portion of the HE-PPDU is extended; and if the HE-PPDU portion is extended, use the extended portion to improve channel estimates.

In Example 19, the subject matter of Example 18 can optionally include where the circuitry is configured to determine if the HE-LTF portion is extended based on one from the following group: a received trigger frame and signal fields to be received before the HE-LTF portion of the HE-PPDU.

In Example 20, the subject matter of Example 18 or 19 can optionally include where the circuitry is configured to determine if the HE-LTF portion is extended based on a number of space time streams allocated to the HEW device and at least one other HEW device.

In Example 21, the subject matter of any of Examples 18-20 can optionally include where the circuitry is configured to determine that the HE-LTF portion is not extended if at most one space time stream is allocated to the HEW device and at most one space time stream is allocated to one or more other HEW devices.

In Example 22, the subject matter of any of Examples 18-21 can optionally include where the circuitry is further configured to receive the HE-LTF in accordance with multiple-user multiple-input multi-output (MU-MIMO).

In Example 23, the subject matter of any of Examples 18-22 can optionally include memory coupled to the circuitry; and, one or more antennas coupled to the circuitry.

Example 24 is a non-transitory computer-readable storage medium that stores instructions for execution by one or more processors, the instructions to configure the one or more processors to cause a high-efficiency wireless local-area network (HEW) device to determine if a HE long training field (HE-LTF) portion of a HE physical layer convergence procedure (PLCP) protocol data unit (HE-PPDU) is to be extended, and if the HE-LTF portion is to be extended, configure the HE-LTF portion to use a longer symbol duration, or one or more additional HE-LTFs; and transmit the HE-PPDU in accordance with orthogonal frequency division multiple access (OFDMA).

In Example 25, the subject matter of Example 24 can optionally include where the HE-LTF portion is to start at a same start time and end at a same end time as one or more other HE-LTF portions of one or more other HE-PPDUs, and where the HE-LTF portion is to be extended if a HE-LTF portion of the one or more other HE-PPDUs has a longer duration than the HE-LTF portion of the HE-PPDU.

Example 26 is an apparatus of a high-efficiency (HE) wireless local-area network (HEW) device. The apparatus including means for determining if a HE long training field (HE-LTF) portion of a HE physical layer convergence procedure (PLCP) protocol data unit (HE-PPDU) is to be extended, and means for configuring the HE-LTF portion to use a longer symbol duration, or one or more additional HE-LTFs, if the HE-LTF portion is to be extended. The apparatus may include means for transmitting the HE-PPDU in accordance with orthogonal frequency division multiple access (OFDMA).

In Example 27, the subject matter of Example 26 can optionally include where the HE-LTF portion is to start at a same start time and end at a same end time as one or more other HE-LTF portions of one or more other HE-PPDUs.

In Example 28, the subject matter of Example 26 can optionally include where the HE-LTF portion is to be extended if a HE-LTF portion of the one or more other HE-PPDUs has a longer duration than the HE-LTF portion of the HE-PPDU.

In Example 29, the subject matter of Example 26 can optionally include means for determining the start time and the end time based on a received trigger frame.

In Example 30, the subject matter of Example 26 can optionally include where the HE-LTF portion is to be extended to have a same duration as a longest duration of the HE-LTF portion of the one or more other HE-PPDUs.

In Example 31, the subject matter of any of Examples 26-30 can optionally include means for determining a number of long training symbols to generate for the HE-LTF portion based on a number of space time streams allocated to a HEW device to which the HE-PPDU is to be transmitted.

In Example 32, the subject matter of any of Examples 26-31 can optionally include means for transmitting the HE-PPDU in accordance with multiple-user multiple-input multi-output (MU-MIMO).

In Example 33, the subject matter of any of Examples 26-32 can optionally include means for generating a resource allocation comprising a channel allocation, a duration, and a number of space-time-streams, and means for determining to extend the HE-LTF portion based on the number of space-time-streams allocated to a HEW device to which the HE-PPDU is to be transmitted.

In Example 34, the subject matter of any of Examples 26-33 can optionally include where the longer symbol duration is at least one from the following group: 12.8 µs, 2 times a symbol duration of another HE-LTF portion of one or more other HE-PPDUs, and 4 times a symbol duration of a legacy standard.

In Example 35, the subject matter of any of Examples 26-34 can optionally include means for determining to use the longer symbol duration or to repeat a HE-LTF field based on a performance of a second HEW device, and means for transmitting the HE-PPDU in accordance with OFDMA to the second HEW device.

In Example 36, the subject matter of any of Examples 26-35 can optionally include where the HEW device is one from the following group: a master station, an access point, a station, and a HEW station.

In Example 37, the subject matter of any of Examples 26-36 can optionally include where the a one or more additional HE-LTFs are one from the following group: duplicates of other HE-LTFs of the HE-LTF portion, duplicates of other HE-LTF fields of the HE-LTF portion with a different overlay, and different sequences from other HE-LTF fields of the HE-LTF portion.

In Example 38, the subject matter of any of Examples 26-37 can optionally memory coupled to the transceiver circuitry and processing circuitry; and one or more antennas coupled to the transceiver circuitry and processing circuitry.

Example 39 is an apparatus of a high-efficiency (HE) wireless local-area network (HEW) device. The apparatus including means for receiving a HE long training field (HE-LTF) portion of a HE physical layer convergence procedure (PLCP) protocol data units (HE-PPDUs), and means for determining if the HE-LTF portion of the HE-PPDU is extended. The apparatus may include means for using the extended portion to improve channel estimates if the HE-PPDU portion is extended.

In Example 40, the subject matter of Example 39 can optionally include means for determining if the HE-LTF portion is extended based on one from the following group: a received trigger frame and signal fields to be received before the HE-LTF portion of the HE-PPDU.

In Example 41, the subject matter of Examples 39 or 40 can optionally include means for determining if the HE-LTF portion is extended based on a number of space time streams allocated to the HEW device and at least one other HEW device.

In Example 42, the subject matter of any of Examples 39-41 can optionally include means for determining that the HE-LTF portion is not extended if at most one space time stream is allocated to the HEW device and at most one space time stream is allocated to one or more other HEW devices.

In Example 43, the subject matter of any of Examples 39-42 can optionally include means for receiving the HE-LTF in accordance with multiple-user multiple-input multi-output (MU-MIMO).

In Example 44, the subject matter of any of Examples 39-43 can optionally include memory coupled to the circuitry; and, one or more antennas coupled to the circuitry.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless device, the apparatus comprising memory: and, circuitry configured to:
    determine if a HE long training field (HE-LTF) portion of a HE physical layer convergence procedure (PLCP) protocol data unit (HE-PPDU) is to be extended;
    if the HE-LTF portion is to be extended, configure the HE-LTF portion to use a longer symbol duration than a symbol duration of one or more other HE-LTF portions of one or more other HE-PPDUs that are to be concurrently transmitted, wherein the HE-LTF portion is to start at a same start time and end at a same end time as the one or more other HE-LTF portions, wherein the longer symbol duration is 6.4 µs or 12.8 µs; and
    simultaneously transmit the HE-PPDU and the one or more other HE-PPDUs in accordance with orthogonal frequency division multiple access (OFDMA).

2. The apparatus of claim 1, wherein the HE-LTF portion is to be extended if a HE-LTF portion of the one or more other HE-PPDUs has a longer duration than the HE-LTF portion of the HE-PPDU.

3. The apparatus of claim 2, wherein the HE-LTF portion is to be extended to have a same duration as a longest duration of the HE-LTF portion of the one or more other HE-PPDUs.

4. The apparatus of claim 1, wherein the circuitry is configured to determine the start time and the end time based on a received trigger frame.

5. The apparatus of claim 1, wherein the circuitry is configured to determine a number of long training symbols to generate for the HE-LTF portion based on the longer symbol duration and a number of space time streams allocated to a HE wireless device to which the HE-PPDU is to be transmitted.

6. The apparatus of claim 1, wherein the circuitry is further configured to transmit the HE-PPDU in accordance with multiple-user multiple-input multi-output (MU-MIMO).

7. The apparatus of claim 1, wherein the circuitry is further configured to:
    generate a resource allocation comprising a channel allocation, a duration, and a number of space-time-streams; and
    determine to extend the HE-LTF portion based on the number of space-time-streams allocated to a HE wireless device to which the HE-PPDU is to be transmitted.

8. The apparatus of claim 1, wherein the longer symbol duration is at least one from the following group: 12.8 µs, 2 times a symbol duration of another HE-LTF portion of one or more other HE-PPDUs, and 4 times a symbol duration of a legacy standard.

9. The apparatus of claim 1, wherein the circuitry is further configured to:

determine to use the longer symbol duration based on a performance of a second HE wireless device; and transmit the HE-PPDU in accordance with OFDMA to the second HE wireless device.

10. The apparatus of claim 1, wherein the HE wireless device is one from the following group: a master station, an access point, a station, and a HE station.

11. The apparatus of claim 1, wherein the circuitry is further configured to: repeat one or more additional HE-LTF, and wherein the one or more additional HE-LTFs are one from the following group: duplicates of other HE-LTFs of the HE-LTF portion, duplicates of other HE-LTF fields of the HE-LTF portion with a different overlay, and different sequences from other HE-LTF fields of the HE-LTF portion.

12. The apparatus of claim 1, further comprising transceiver circuitry coupled to the memory; and one or more antennas coupled to the transceiver circuitry.

13. An apparatus of claim 1, wherein the memory is configured to store the HE-PPDU.

14. A method performed by a high-efficiency (HE) wireless device, the method comprising:
determining if a HE long training field (HE-LTF) portion of a HE physical layer convergence procedure (PLCP) protocol data unit (HE-PPDU) is to be extended;
if the HE-LTF portion is to be extended, configure the HE-LTF portion to use a longer symbol duration than a symbol duration of one or more other HE-LTF portions of one or more other HE-PPDUs that are to be concurrently transmitted, wherein the HE-LTF portion is to start at a same start time and end at a same end time as the one or more other HE-LTF portions, wherein the longer symbol duration is 6.4 µs or 12.8 µs; and
simultaneously transmitting the HE-PPDU and the one or more other HE-PPDUs in accordance with orthogonal frequency division multiple access (OFDMA).

15. The method of claim 14, wherein the HE-LTF portion is to be extended if a HE-LTF portion of the one or more other HE-PPDUs has a longer duration than the HE-LTF portion of the HE-PPDU.

16. The method of claim 14, wherein the HE-LTF portion is to be extended to have a same duration as a longest duration of the HE-LTF portion of the one or more other HE-PPDUs.

17. A non-transitory computer-readable storage medium that stores instructions for execution by one or more processors, the instructions to configure the one or more processors to cause a high-efficiency (HE) wireless device to:
determine if a HE long training field (HE-LTF) portion of a HE physical layer convergence procedure (PLCP) protocol data unit (HE-PPDU) is to be extended;
if the HE-LTF portion is to be extended, configure the HE-LTF portion to use a longer symbol duration than a symbol duration of one or more other HE-LTF portions of one or more other HE-PPDUs that are to be concurrently transmitted, wherein the HE-LTF portion is to start at a same start time and end at a same end time as the one or more other HE-LTF portions, wherein the longer symbol duration is 6.4 µs or 12.8 µs; and
simultaneously transmit the HE-PPDU and the one or more other HE-PPDUs in accordance with orthogonal frequency division multiple access (OFDMA).

18. The non-transitory computer-readable storage medium of claim 17, wherein the HE-LTF portion is to start at a same start time and end at a same end time as the one or more other HE-LTF portions of the one or more other HE-PPDUs, and wherein the HE-LTF portion is to be extended if a HE-LTF portion of the one or more other HE-PPDUs has a longer duration than the HE-LTF portion of the HE-PPDU.

* * * * *